United States Patent [19]

Dawans

[11] Patent Number: 5,252,641
[45] Date of Patent: Oct. 12, 1993

[54] PROCESS FOR PRODUCTION OF BITUMINOUS COMPOSITIONS CONTAINING POLYMERIC RESIDUES

[75] Inventor: Francois Dawans, Bougival, France

[73] Assignee: Institut Francais du Petrole, Rueil Malmaison, France

[21] Appl. No.: 918,900

[22] Filed: Jul. 21, 1992

Related U.S. Application Data

[63] Continuation of Ser. No. 658,627, Feb. 21, 1991, abandoned.

[30] Foreign Application Priority Data

Feb. 21, 1990 [FR] France .............................. 90 02137

[51] Int. Cl.$^5$ .......................................... C08L 95/001
[52] U.S. Cl. ........................................ 524/59; 52/68; 52/70; 52/71
[58] Field of Search ................... 524/59, 60, 63, 64, 524/66, 68, 69, 70, 71

[56] References Cited

U.S. PATENT DOCUMENTS

| | | | |
|---|---|---|---|
| 2,861,895 | 11/1958 | Hardman | 106/281 |
| 2,964,424 | 12/1960 | Mast | 117/98 |
| 3,257,336 | 6/1966 | Levy et al. | 260/2.5 |
| 3,298,971 | 1/1967 | Davie | 260/2.9 |
| 3,470,016 | 9/1969 | Biles et al. | 117/76 |
| 3,484,507 | 12/1969 | Smith | 264/40 |
| 3,491,047 | 1/1970 | Hotten | 260/28.5 |
| 3,783,134 | 1/1974 | Schoen | 260/28 |
| 4,000,095 | 12/1976 | Van Den Berg | 524/69 |
| 4,028,288 | 6/1977 | Turner | 260/2.3 |
| 4,120,832 | 10/1978 | Ceintry | 524/66 |
| 4,419,469 | 12/1983 | Böhm et al. | 524/68 |
| 4,427,818 | 1/1984 | Prusinski | 524/442 |
| 4,490,493 | 12/1984 | Mikols | 524/68 |
| 4,650,820 | 3/1987 | Decroix | 524/69 |
| 4,677,146 | 6/1987 | Senz | 524/69 |
| 4,724,245 | 2/1988 | Lalanne et al. | 524/61 |
| 4,797,434 | 1/1989 | Lovatt-Smith | 524/60 |
| 4,818,367 | 4/1989 | Winkler | 208/23 |
| 4,874,432 | 10/1989 | Kriech et al. | 106/273.1 |
| 4,973,615 | 11/1990 | Futamura et al. | 524/66 |
| 4,987,166 | 1/1991 | Jacono et al. | 524/71 |
| 5,025,108 | 6/1991 | Cameron et al. | 585/500 |
| 5,070,123 | 12/1991 | Moran | 524/69 |
| 5,095,055 | 5/1992 | Moran | 524/59 |

FOREIGN PATENT DOCUMENTS

| | | | |
|---|---|---|---|
| 2408988 | 2/1974 | Fed. Rep. of Germany . | |
| 0036548 | 4/1981 | Japan | 524/59 |
| 61-272250 | 5/1985 | Japan . | |
| 6416864 | 7/1987 | Japan . | |
| 7305611 | 10/1974 | Netherlands | 524/59 |
| 7305619 | 10/1974 | Netherlands . | |
| 1419092 | 3/1973 | United Kingdom . | |
| 1419093 | 3/1973 | United Kingdom . | |
| 88/02387 | 9/1987 | World Int. Prop. O. . | |

OTHER PUBLICATIONS

Encyclopedia of Polymer Science and Engineering, vol. 13, Poly(phenylene Ether) to Radical Polymerization, John Wiley & Sons, pp. 264–274.

*Primary Examiner*—Paul R. Michl
*Assistant Examiner*—Peter Szekely
*Attorney, Agent, or Firm*—Millen, White, Zelano & Branigan

[57] ABSTRACT

The invention relates to a process for the production of bituminous compositions containing residues of polymers and in particular sterile car waste resulting mainly from the crushing and cutting into small pieces of car bodies. The process involves five successive stages, namely a grinding of the polymer mixture, washing with water to eliminate soil, drying, mixing with pulverulent bitumen and shaping, preferably by extrusion and granulation or compacting by compression. The polymer residue-concentrated bituminous compositions can be advantageously used in the diluted state for improving the use and stability characteristics, as well as the mechanical properties of bitumens for use in roads or industry.

23 Claims, No Drawings

PROCESS FOR PRODUCTION OF BITUMINOUS COMPOSITIONS CONTAINING POLYMERIC RESIDUES

This application is a continuation of application Ser. No. 07/658,627, filed Feb. 21, 1991 now abandoned.

BACKGROUND OF THE INVENTION

Polymers are used as additives in asphalts and bitumens for processing in roads or industry, either for improving their use characteristics by modifying the hot rheological properties, or for improving their physicochemical properties (cold brittleness, toughness, flexibility, stability, thermal susceptibility, mechanical resistance to shocks, vibrations, abrasions, etc.).

In general, the polymers used are thermoplastics (olefin copolymers or polymers), rubbers and in particular thermoplastic elastomers (multiblock copolymers of diolefins and styrene), or to a lesser extent, thermosetting resins (polyurethanes, epoxy resin, phenol formaldehyde). According to the prior art, these polymers can be used alone or in mixed form. For example, it has been proposed to recycle as additives for bitumens, manufacturing waste materials (waxes of polyethylene, atactic polypropylene, polyvinyl alcohol, powdered vulcanized rubber waste, etc.) or plastic waste obtained from domestic refuse and more particularly plastic packs. In the latter case, the mixtures of polymers essentially contain polyolefins, polyvinyl chloride, polystyrene and polyethylene terephthalate.

Polymers are added in small quantities (generally 2 to 10% by weight) to bitumens, in the form of "simple" mixtures involving no chemical reaction or interaction between the constituents, or in the form of "complex" mixtures involving a chemical reaction or interaction between the polymer and certain constituents of the bitumen (asphaltenes, malthenes, resins, etc.), optionally in the presence of a third constituent (catalyst or reagent). Usually the polymers are dispersed in the solid or melted state in a previously heated bitumen excess and, after stirring, the mixtures are used as they are in the melted state, or cooled to the solid state, and are optionally ground or granulated. Certain processes for the production of a mixture in the melted state of olefin polymer-added road-making bitumens, recommend the addition of at least 5 to 30% by weight of mineral particles, which accelerate the dissolving of the polymer in the bitumen (cf. e.g. U.S. Pat. No. 3,336,252, published Aug. 15, 1967). U.S. Pat. No. 4,028,293 published on Jun. 7, 1977 claims the production of a bitumen-containing material, which is more particularly used in the road-making and building fields and which is obtained by the high temperature reaction (at least at 180° C.) of a mineral compound such as sand or gravel with a polymer or a mixture of polymers obtained from domestic or household refuse. The resulting mixture is then added hot to the bitumen and cooled. A major disadvantage of this method is the final cost of the operation, which involves a high temperature preheating of a large amount of mineral material prior to the addition of the polymer or polymers.

SUMMARY OF THE INVENTION

The present invention relates to a simplified, economic process for the recycling of polymer waste in road-making or industrial bitumens. This process is particularly suitable for the recycling of "sterile car waste", i.e. plastic waste resulting from the breaking up of cars and which may optionally contain minor proportions of other polymer waste materials, e.g. resulting from the breaking up of electrical domestic appliances.

The generic term "sterile car waste" or "car crushing residues or wastes" designates all mineral and organic materials resulting from the crushing or cutting into small pieces of mainly car bodies and to a lesser extent electrical domestic appliances and industrial waste, obtained after the separation of the main metallic materials, e.g. using magnetic sorting processes, by gravitation or hydrocyclones, by flotation or manual processes. These recovered metallic materials are presently recycled as starting materials in the metallurgical industry. However, the recycling of non-metallic or sterile "waste" causes a serious problem due to the heterogeneity of the material. Thus, it is a mixture having a variable composition and constituted by non-metallic mineral particles and various polymers, such as expanded or foam materials, vulcanized rubbers, synthetic fibres, thermoplastics and thermoset resins.

Bearing in mind the ever increasing quantities of polymer materials used during the construction of vehicles and electrical domestic appliances, it has become necessary to find new ways for getting rid of these sterile materials, which are satisfactory both from the economic and ecological standpoints for the protection of the environment. It has already been proposed to get rid of most sterile car waste materials by incineration, in the same way as for household refuse. Although the construction of specific incineration plants for sterile car waste is possible from a technical standpoint, it is not at present the most satisfactory solution from the energy and financial standpoints, due to the fact that for reasons of ecological protection it is necessary to remove the dust from the combustion fumes and smoke and also to retain discharges of toxic or corrosive gases. As with plastic waste materials resulting from packs and domestic refuse, consideration has also been given to the recycling of sterile car waste as second generation starting materials, used either alone or mixed with new first generation materials. However, in view of their more heterogeneous composition, the use of sterile car waste as recycled material has hitherto remained limited and does not make it possible to envisage a significantly large scale application to get rid of large quantities of sterile materials. Therefore most sterile car waste is at present stored in protected dumps, which involves ever higher storage costs and which, despite all the precautions taken, is a relatively unsatisfactory solution from the environmental protection standpoint.

It is for this reason that the inventive use of sterile car waste to improve the properties of road-making and industrial asphalts and bitumens constitutes a useful and advantageous recycling means, at least if there is a simple and reliable procedure for producing the mixtures. Unlike in the case of the aforementioned prior art processes which are essentially limited to the recycling of plastic domestic refuse in bitumens, the improved process according to the present invention makes it possible to use more heterogeneous and complex mixtures of polymers, such as sterile car waste.

The bitumen (asphalt) used according to the present invention is a natural constituent of crude and mineral oils. It is obtained by deasphalting, e.g. by precipitation with propane, or by the distillation of refining products (pitch) and/or the cracking of petroleum products. It can also be obtained from coal tar.

Without passing beyond the scope of the invention, it is also possible to use a bitumen fluxed e.g. with the aid of aromatic residues or distillates, or an air or oxidized bitumen.

The main originality of the present invention is that it valorizes complex mixtures of organic polymers resulting mainly from the crushing and cutting into small pieces of cars and to a lesser extent electrical domestic appliances and industrial waste, these being added to bitumen or asphalt binders and by improving certain properties with a view to use in the coating of solid materials such as gravel, coatings or coverings and in particular in the road-making, construction, public works and special equipment fields.

The process according to the invention consists of preparing a polymer residue-rich bituminous mixture, more particularly of sterile car waste, which can then advantageously be used in the diluted state for improving the mechanical, stability and use properties of road-making or industrial bitumens.

The process according to the invention involves five successive stages, namely a grinding of the polymer residues, washing, drying, mixing with pulverulent bitumen and shaping preferably by extrusion and granulation or by compacting by compression.

In more detailed manner, the process consists of crushing a mixture of sterile car waste such as is obtained during the cutting up into pieces of cars (or an equivalent polymer residue), following the separation of the metals. This mixture contains soil, a few residual metal fragments and various polymers, mainly (e.g. at least 80% by weight) polyvinyl chloride, polypropylene, polyurethane foam and to a lesser extent polyesters and acrylonitrile-butadiene-styrene (ABS) resin.

Crushing, optionally followed by screening, is carried out in such a way as to obtain a particle size below 10 mm and preferably between on average 2 and 4 mm. The pulverulent mixture is washed with water at a temperature which is preferably between 20° and 60° C. in order to eliminate soil and is dried at a temperature preferably between 80° and 120° C., e.g. by passing into a pulsed air rotary oven. Without passing beyond the scope of the invention, it is possible to take advantage of the water washing stage of the sterile car waste to separate, e.g. by flotation, the expanded materials contained in the sterile waste, such as polyurethane foams.

This is followed by the addition, e.g. in a powder mixer, of the bitumen or asphalt in the solid state and previously ground at a temperature preferably below 40° C., in order to obtain a particle size below 10 mm. The mixture contains 95 to 40% by weight polymers and 5 to 60% by weight bitumen or asphalt, the said mixture representing at least 90% by weight of the final bituminous composition.

The mixture obtained is then extruded at a temperature e.g. between 150° and 250° C. and is granulated preferably at the correct ambient temperature of the extruder, so as to permit a high extrusion rate. It can also be agglomerated into bricks at a temperature preferably between 50° and 120° C. by compression, e.g. at between 20 and 50 MPa, the compression heat making the bitumen melt. In this way a recycled polymer-rich bitumen-containing product is obtained, which can be easily stored, metered and rapidly redissolved in a melted bitumen excess during its final use.

The bituminous bricks or granulates obtained can be advantageously covered with a little talc in order to prevent agglomeration and adhesion thereof during storage. They are then directly used for the formulation of road-making or industrial bitumens prior to the use thereof, so as to obtain a polymer content preferably between 4 and 20% by weight based on the weight of the final bituminous composition and they have the advantage of being rapidly mixable with a melted bitumen excess.

The following examples illustrate the invention.

EXAMPLE 1

A crude, humid mixture of sterile material resulting directly from the cutting into pieces of cars and containing 65% by weight of various polymers, 30% by weight soil and mineral residues and 5% by weight water is treated in a wet impeller breaker so as to obtain particles with a size between 2 and 4 mm. It is then washed by a water stream at ambient temperature, which makes it possible to eliminate more than 95% by weight of the inorganic fraction. The polymer powder obtained is then suction filtered and dried for 10 minutes by passing into a pulsed air rotary oven at 110° C.

In addition, a SAFANIYA bitumen is ground so as to obtain a powder of average size 2 to 4 mm.

Into a powder mixer is introduced 8 kg of sterile car waste powder and 2 kg of bitumen powder and the mixture is stirred at ambient temperature for 10 minutes. The pulverulent mixture is extruded in a single-screw extruder at 210° C. and on leaving the extruder it is granulated into pellets onto which is pulverized a little talc.

The granules are stored at a temperature below 40° C. for 6 weeks and are then incorporated into a SAFANIYA bitumen excess. For this purpose, 10 kg of bitumen are heated to 200° to 250° C. and to them are added, accompanied by stirring and in 15 minutes, 4 kg of granules of a polymer-concentrated bituminous composition and the stirring of the melted mixture is continued for 10 minutes, so as to obtain a homogeneous final mixture more particularly ready for use as a road-making bitumen for the coating of gravel.

The Brookfield viscosity measured with a coaxial cylinder viscosimeter at 180° C. is 3.2. A flexibility test is carried out on a bituminous ribbon of dimensions $2 \times 30 \times 100$ mm conditioned for one hour at a constant temperature and then bent round a diameter 10 mm mandrel for approximately 5 seconds. The flexibility temperature, measured during the appearance of microcracks, is close to $-20°$ C.

EXAMPLE 2

The sterile car waste and SAFANIYA bitumen are ground as in example 1. Into a powder mixer are introduced 6 kg of dry sterile car waste powder and 4 kg of bitumen powder and the mixture is stirred at 50° C. for 5 minutes. It is then introduced into $4 \times 6 \times 16$ cm moulds and compressed at 40 MPa for 1 minute. The pressure is released and, after mould removal, bricks are obtained with a polymer-concentrated bituminous composition which, as in example 1, can be subsequently added to a bitumen excess.

I claim:

1. A process for obtaining a bituminous composition containing waste polymer, comprising the steps of:
    (a) grinding a mixture of waste polymers comprising thermoplastics and thermally cross-linked materials to a powder having a size below 10 mm;
    (b) washing said powder with water;
    (c) drying the washed powder;

(d) mixing the dried powder with pulverulent bitumen having a size below 10 mm; and (e) shaping the mixture obtained by heating and extruding the mixture at a temperature suitable extrusion or by compressing the mixture under a pressure of from 20-50 MPa.

2. A process according to claim 1, wherein the waste polymer mixtures of thermoplastics containing more than 6% by weight of thermally crosslinked materials.

3. A process according to claim 1, wherein the waste polymers contain more than 80% by weight of a mixture of polyvinyl chloride, polypropylene, polyurethane foam, polyesters and acrylonitrile-butadiene-styrene resin.

4. A process according to claim 1, wherein the particles have an average size between 2 and 4 mm.

5. A process according to claim 1, wherein 95 to 40 parts by weight of the ground waste polymer powder in washed and dried form are mixed with 5 to 60 parts by weight of pulverulent bitumen, said mixture representing at least 90% of the weight of the final bituminous composition.

6. A process according to claim 1, wherein the shaping is conducted by extrusion at a temperature between 150° and 250° C.

7. A process according to claim 1, wherein the shaping is conducted by an agglomeration by compression.

8. Bituminous composition obtained by the process of claim 1.

9. A method of preparing a road making or industrial bitumen composition comprising redissolving or dispersing a polymer-bitumen composition in a melted bitumen excess, so as to supply a bitumen mixture for the coating of solid materials, said polymer-bitumen composition obtained by the steps of:

(a) grinding a mixture of waste polymers comprising thermoplastics and thermally cross-linked materials to a powder having a size below 10 mm;

(b) washing said powder with water;

(c) drying the washed powder;

(d) mixing the dried powder with pulverulent bitumen having a size below 10 mm; and (e) shaping the mixture obtained by heating and extruding the mixture at a temperature suitable extrusion or by compressing the mixture under a pressure of from 20-50 MPa.

10. A method according to claim 9, wherein said polymer-bitumen composition amounts to 4-20% of the final bitumen mixture.

11. A method according to claim 9, further comprising coating gravel with said bitumen mixture.

12. A process according to claim 1, wherein said waste polymers are mixtures comprising thermoplastics and a member selected from the group consisting of vulcanized rubbers and thermoset resins.

13. A process according to claim 1, wherein said waste polymers are predominantly sterile car waste materials.

14. A method according to claim 9, wherein said waste polymers are predominantly sterile car waste materials.

15. A method according to claim 11, wherein said waste polymers are predominantly sterile care waste materials.

16. A process according to claim 1, further comprising storing resultant shaped objects.

17. A process according to claim 3, further comprising removing said polyurethane foam by flotation during said washing step.

18. A process according to claim 16, wherein said shaping is conducted by extrusion at 150°-250° C., and the resultant extrudate is granulated.

19. A process according to claim 16, wherein said shaping is conducted by compression at 50°-120° C. between 20 and 50 MPa to form bricks.

20. A process according to claim 18, further comprising coating resultant granulates with talc to prevent conglomeration and adhesion during storage.

21. A process according to claim 19, further comprising coating resultant bricks with talc to prevent conglomeration and adhesion during storage.

22. A process for obtaining a bituminous composition in brick form consisting essentially of waste polymer and bitumen, comprising the steps of:

(a) grinding a mixture of waste polymer containing more than 80% by weight of a mixture of polyvinyl chloride, polypropylene, polyurethane foam, polyesters and acrylo-nitrile-butadiene-styrene resin to a powder having an average particle size of between 2-4 mm;

(b) washing the resultant powder with water at a temperature of between 20°-60° C.;

(c) drying the resultant washed powder at a temperature of between 80°-120° C.;

(d) mixing the resultant dried powder with pulverulent bitumen having a size below 10 mm so as to obtain a mixture of 95-40% by weight waste polymer powder and 5-60% by weight bitumen, said mixture representing at least 90% by weight of final bituminous composition;

(e) compressing the resultant dried powder into bricks at a temperature between 50°-120° C. under a pressure of 20-50 MPa;

(f) coating resultant bricks with talc to prevent conglomeration and adhesion during storage; and (g) storing said bricks.

23. A process according to claim 22, wherein said waste polymer is sterile car waste, containing more than 6% by weight of thermally crosslinked materials.

* * * * *